Oct. 14, 1952 N. RYCROFT 2,614,001
WHEEL COVER SECURING MEANS
Filed June 7, 1949 7 Sheets-Sheet 1

FIG.I.

Oct. 14, 1952     N. RYCROFT     2,614,001
WHEEL COVER SECURING MEANS

Filed June 7, 1949     7 Sheets-Sheet 2

Oct. 14, 1952 N. RYCROFT 2,614,001
WHEEL COVER SECURING MEANS
Filed June 7, 1949 7 Sheets-Sheet 4

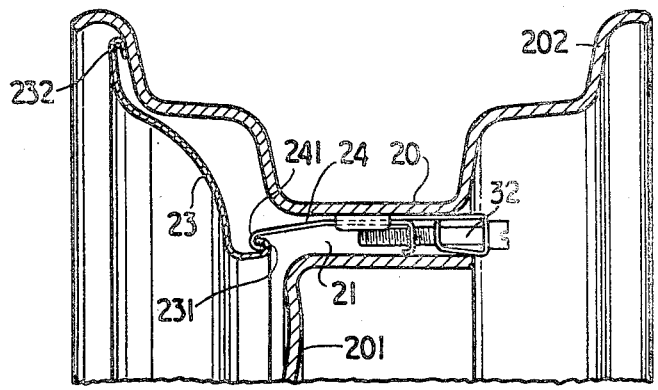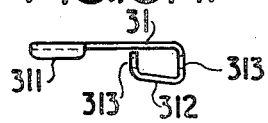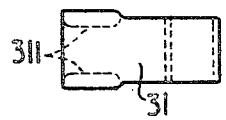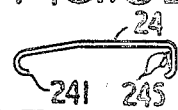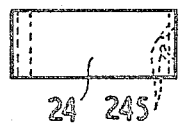

Oct. 14, 1952   N. RYCROFT   2,614,001
WHEEL COVER SECURING MEANS
Filed June 7, 1949   7 Sheets-Sheet 6
FIG.II.
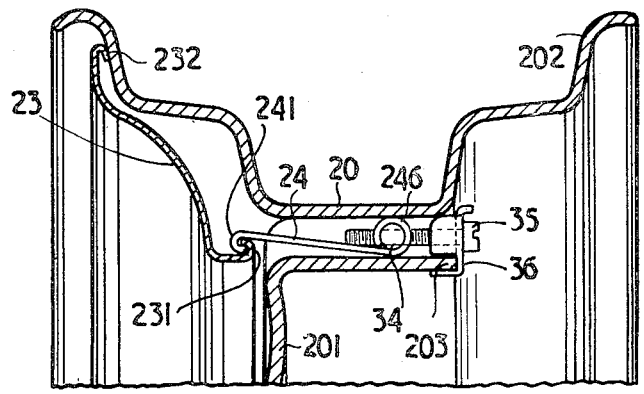
FIG.IIA.   FIG.IIB.
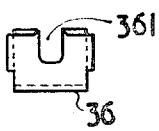   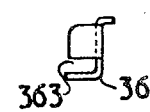
FIG.IIC.
FIG.IID.   FIG.IIE.
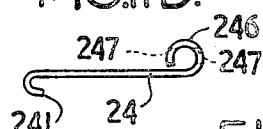   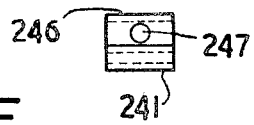
FIG.IIF.
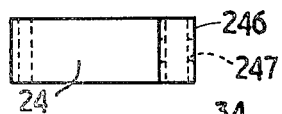
FIG.IIG.
FIG.IIH.

Oct. 14, 1952      N. RYCROFT      2,614,001
WHEEL COVER SECURING MEANS
Filed June 7, 1949      7 Sheets-Sheet 7
FIG.12.
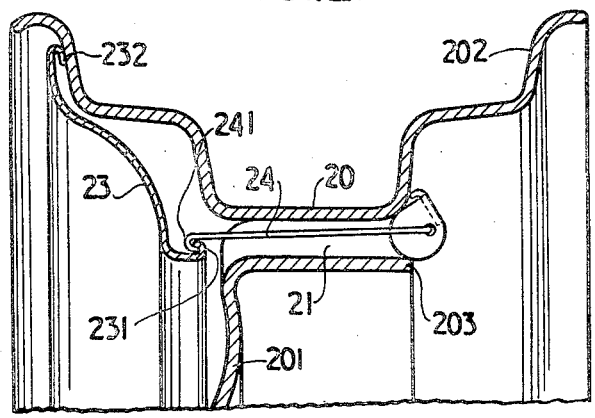
FIG.12A.      FIG.12B.
 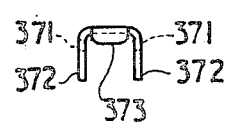
FIG.12C.
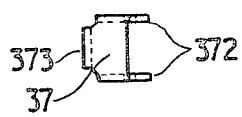
FIG.12D.      FIG.12E.
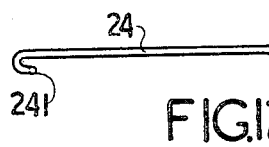 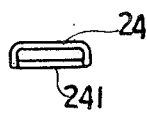
FIG.12F.
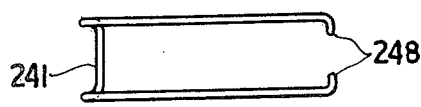
Norman Rycroft
by Kenway, Jenney, Witter & Hildreth
Attys.

Patented Oct. 14, 1952

2,614,001

UNITED STATES PATENT OFFICE 2,614,001

WHEEL COVER SECURING MEANS

Norman Rycroft, Meriden, England, assignor to Cornercroft Limited, Coventry, England, a corporation of Great Britain Application June 7, 1949, Serial No. 97,538
In Great Britain January 12, 1949

9 Claims. (Cl. 301—37)

This invention has reference to an improved method of securing annular attachments to the wheels of vehicles and has for its primary object to provide an improved method of securing annular attachments to vehicle wheels of the pressed type which is simple, efficient, relatively cheap and which enables a securing or detaching operation to be performed readily.

According to the invention the improved means for embellishing pressed vehicle wheels comprises an annulus, anchorage means of a hook shape in cross section located on the rear side of the annulus and a plurality of attachment devices each of which incorporates a retractable part adapted to be passed through a gap in a wheel and engaged in hooked relationship with the presented portion of the anchorage means, a part adapted to take an abutment on the opposite side of the wheel to that on which the annulus is to be located and means for imparting a retractile force to the retractable part when engaged with the anchorage means, whereby the annulus may be retracted into position on a wheel and secured thereto with the retractable parts in a state of tension.

The invention will now be described with particular reference to the accompanying drawings which illustrate the invention as applied to the attachment of a rim embellishing annulus to a motor road vehicle wheel of known construction.

In the drawings:

Figure 10 is a fragmentary view partly in elevation and partly in section showing yet another means in accordance with the invention for attaching the annulus to the wheel.

Figures 10A, 10B, 10C, 10D, 10E and 10F are views of the components employed in constructing the securing means illustrated in Figure 10.

Figure 11 is a fragmentary view partly in elevation and partly in section illustrating yet another form of means in accordance with the invention for securing an annulus to a wheel.

Figures 11A, 11B, 11C, 11D, 11E, 11F, 11G and 11H, are detailed views of the components employed in constructing the means illustrated in Figure 11.

Figure 12 is a fragmentary view of still another form of means in accordance with the invention for securing an annulus to a vehicle wheel.

Figures 12A, 12B, 12C, 12D, 12E and 12F are detailed views of the components employed for securing means illustrated in Figure 12.

In the drawings where desirable like numerals of reference indicate similar parts in the several views.

Figure 1:
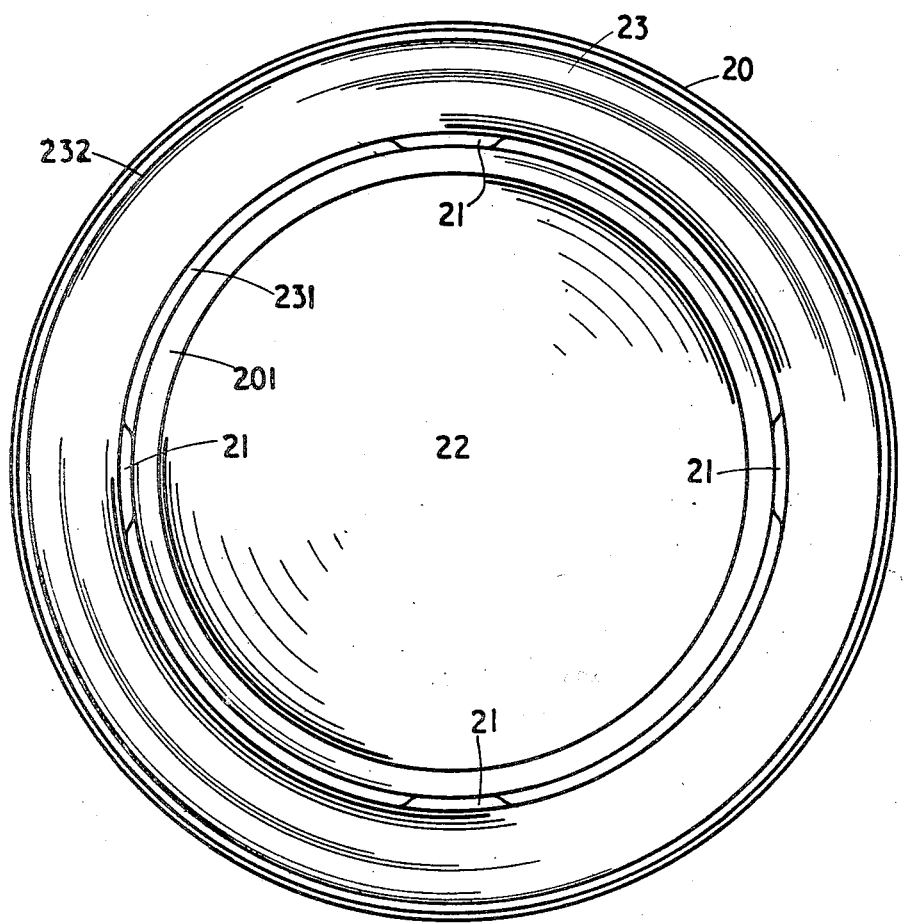
Figure 1 is a front elevation of the wheel with the annulus attached thereto.
Figure 2:
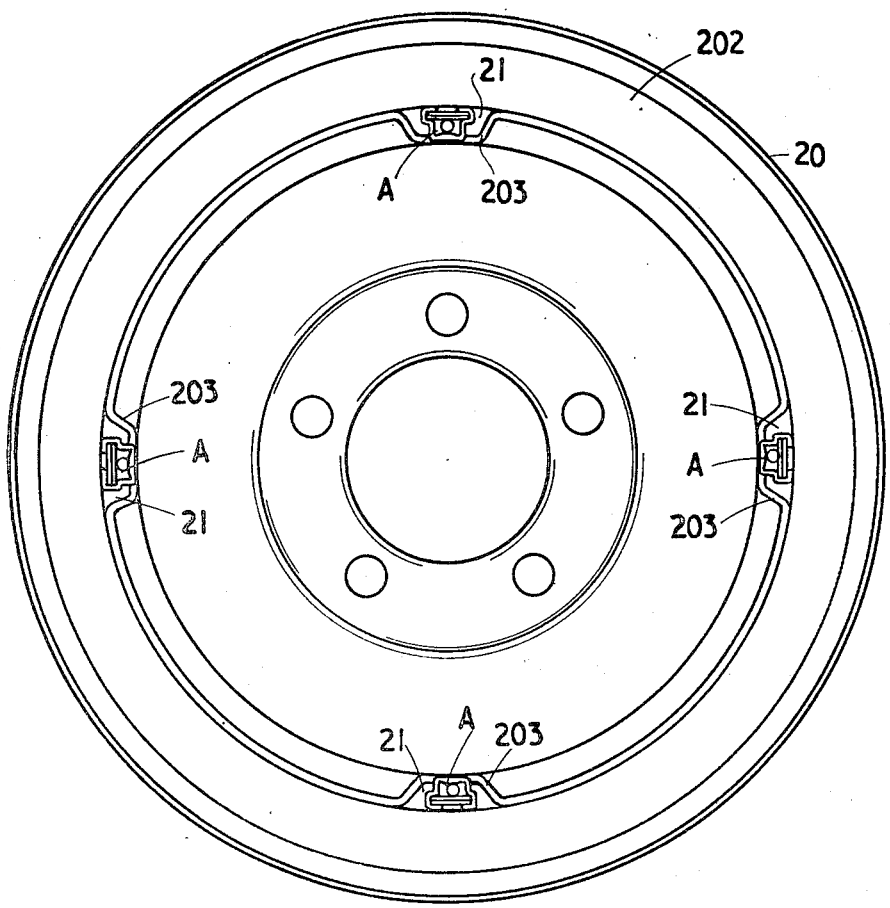
Figure 2 is a rear elevation of the wheel illustrated in Figure 1.
Figure 3:
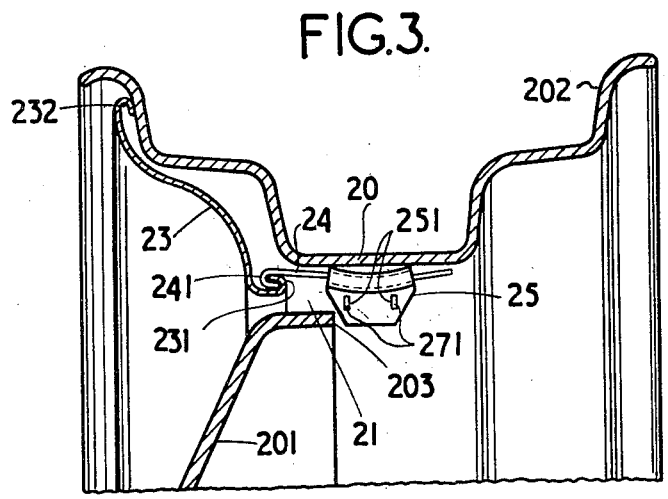
Figure 3 is a fragmentary view on an enlarged scale illustrating one form of means for securing the annulus to the wheel in accordance with the invention.

Referring first to Figures 1 and 2 the road vehicle wheel, designated generally by the reference numeral 20, is of a known construction according to which a nave section 201 which is formed as a pressing is secured to a separately formed rim section 202 usually by riveting or welding and according to which the nave section 201 is provided with shaped portions 203 which co-operate with the adjacent surface of the rim section 202 when the wheel is assembled, to provide adjacent to the rim 202 a plurality of equidistantly spaced arcuate slots 21 for assisting in the cooling of the adjacent brake drum, the number of such slots 21 in the embodiment illustrated being four.

The centre of the nave section 201 of the wheel is enclosed by the usual hub cap 22.

The rim section 202 is adapted to have associated therewith an embellishment annulus 23, the dimensions of which are such that the slots 21 are not covered.

This embellishment annulus 23 is provided around the inner and outer periphery with sections 231, 232 of a shallow hooked shape in cross section and there is adapted to be associated with each of the elongated slots 21 in the wheel a fastening means designated generally in Figures 1 and 2 by the reference A.

Figures 4, 5:
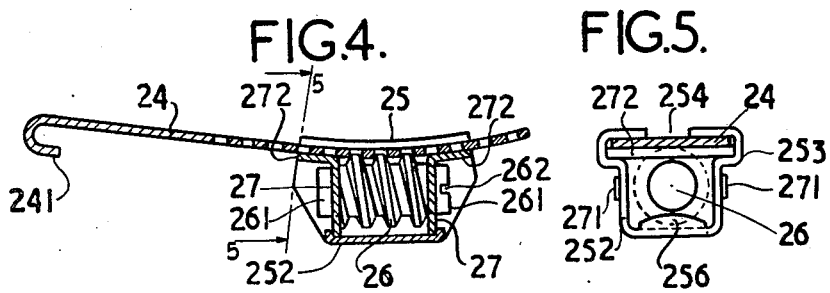
Figure 4 is a longitudinal vertical section of the securing means depicted in Figure 3 shown on a still larger scale.
Figure 5 is a vertical section of Figure 4, the section being taken on the plane indicated by the line 5—5 Figure 4 looking in the direction of the arrows to the said line.
Figure 6:
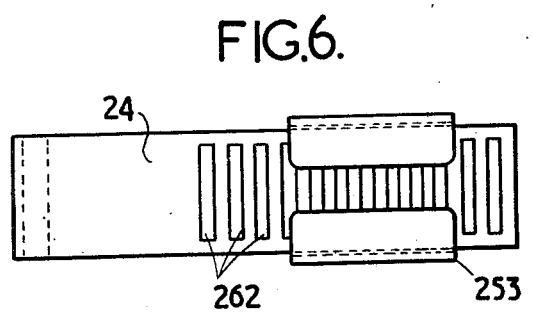
Figure 6 is a plan of Figure 4.

According to the arrangement illustrated with reference to Figures 3 to 6 the inner hooked section 231 is adapted to be engaged by a hooked section 241 formed at one end of a resilient slotted sheet metal strap 24 the rearmost portion of which is slidably mounted within a housing 25 formed as a sheet metal pressing having as depicted in Figures 4–6 a lower portion 252 of channel shape in cross section, the upper portion of the sides of which are turned outwardly, upwardly and then inwardly so as to constitute an upper portion 253 of shallow depth having therein a longitudinal slideway of a rectangular shape in cross section of greater width than the lower portion 252 and with a longitudinal gap 254 in the upper side.

Turnably mounted within the housing 25 is a worm 26 which is turned from a length of rod, the end portions of the worm 26 being turned down to provide plain surfaced cylindrical portions 261 of an external diameter substantially equal to the diameter of the core of the worm 26.

The rearwardly directed end portion 261 of the worm 26 is provided with a diametrically arranged slot 262 for engagement by a screwdriver.

The end portions 261 of the worm 26 are turnably mounted within bearings constituted by holes formed in the centres of tab thrust washers 27 of a generally rectangular shape of a width substantially equal to the width of the narrower portion 252 of the housing 25 and of a depth greater than the said narrower portion 252 the sides of the said washers 27 being provided with tabs 271 adapted to be engaged within slits 251 in the sides of the lower portions of the housing 25 whilst the upper portions of the said tab washers 27 are provided with outwardly directed arcuate extensions 272 which serve as the bottoms of the end portions of the slideway for the strap 24.

At each end the bottom of the housing 25 is provided with upwardly turned ear pieces 256.

The sides of the ends of the housing 25 are of wedge formation with the angle of inclination of the upwardly and outwardly inclined edges arranged at an angle of 30° to the vertical and with the downwardly and outwardly inclined end edges arranged at an angle of approximately 9° to the vertical.

The parts are assembled in the following manner:

The tab washers 27 are placed on the ends 261 of the worm 26 with the arcuate outwardly directed extensions 272 presented away from each other and the worm 26 and tab washers 27 then inserted within the narrower portion 252 of the housing 25 between the ear pieces 256 by passing the assembly of worm 26 and tab washers 27 into the housing 25 through the longitudinal gap 254 in the upper portion thereof.

The side tabs 271 of the tab washers 27 are inserted in the respective slits 255 in the sides of the upper portion of the housing 25 and the sides of the assembly pinched together.

The end portion of the strap 24 is then slidden into the slideway and the worm 26 turned with a screwdriver until the worm 26 engages with the slots 242 of the strap 24.

The device is then ready for use by engaging a hooked end section 241 of a strap 24 with the hooked section 231 of the annulus 23 with the housing 25 in abutment with the portions of the nave section 201 and rim section 202 of the wheel bounding an elongated slot 21 and subsequently turning the worm 26 to cause the annulus 23 to be drawn into firm contact with the rim section 202 of the wheel.

Conveniently for use in the embodiment just described hereinbefore the housing 25 and the outwardly directed extensions 272 of the tab washers 27 are preferably given a bowed arcuate shape.

Instead of a worm 26 a length of screw threaded rod may be used and the term "worm" as used hereinbefore is to be interpreted as including such a screw threaded rod.

It will be appreciated that the wedge formation of the ends of the housing 25 facilitates the self-centring of the housing 25 relatively to the slots 21 in the wheel and ensures non-rotation of the housing 25 during the turning of the worm 26 in the course of securing operations.

Figure 7:
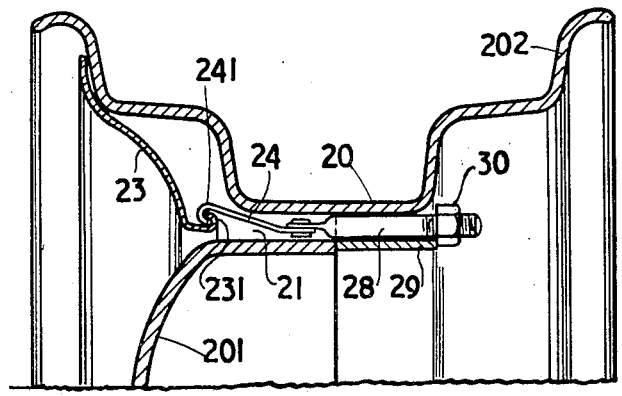
Figure 7 is a fragmentary view illustrating yet another form of means in accordance with the invention for securing an annulus to a wheel.
Figure 8:
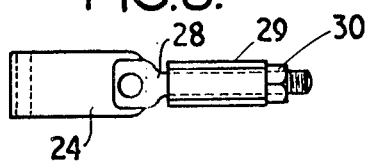
Figure 8 is a plan of the securing means employed in Figure 7.
Figure 9:
Figure 9 is a cross sectional view of the securing means illustrated in Figure 8.

According to the embodiment of the invention as illustrated in Figures 7, 8 and 9 there is adapted to be associated with each of the elongated slots 21 in the wheel a securing means incorporating a resilient strap 24 having at its outer end a hooked section 241 adapted to engage with the lower hooked section 231 of the annulus 23, the rearward end of the strap 24 being riveted to the swaged end of the shank of a drawbolt 28 which is slidably mounted within a sleeve 29 of a greater external diameter than the depth of the slots 21, said sleeve 29 being provided with a flat 291 for a purpose to be described hereinafter.

The rearward end of the drawbolt 28 is threaded for engagement by a nut 30 and the length of the sleeve 29 is such that the nut 30 is free of the rim section 202.

In the operation of securing an annulus to the wheel according to this embodiment of the invention the straps 24 are passed through the elongated slots 21 in the wheel and the hooked ends 241 of the straps 24 engaged with the hooked sections 231 of the annulus 23 with the forward end of the sleeve 29 in abutment with the rear ends of the portions bounding the slots 21 and with the flat 291 in abutment with the underside of the rim section 202.

The nuts 30 on the projecting ends of the respective drawbolts 28 are then turned to draw the bolts 28 through the relevant sleeves 29 in a rearwards direction and thereby draw the annulus 23 into firm contact with the rim section 202 of the wheel.

It will be appreciated that the provision of the flat 291 prevents rotation of the sleeves 29 relatively to the drawbolts 28 as the nuts 30 are being tightened.

According to the embodiment of the invention illustrated in Figures 10, 10A, 10B, 10C, 10D, 10E, and 10F, the securing means comprises a strap 24 provided at its outer end with a hooked section 241 for engagement with the hooked section 231 of the annulus, 23, said strap 24 being slidably mounted within a housing formed in a sheet metal pressing 31 by turning inwardly enlarged portions 311 of the said pressing—see particularly Figures 10A, 10B, 10C which show the said pressing 31 in side elevation, end elevation and plan respectively.

The rearmost portion of the pressing 31 is turned and bent to constitute an open sided box section 312 having in the ends thereof holes 313, said box section 312 being of a slight wedge shape in cross section see particularly Figures 10 and 10A.

Turnably mounted within the holes 313 is the shank of a drawbolt 32 the threaded portion of which is adapted to engage within a hole 244 pierced in a downwardly turned end of the strap 24 the sides of the said hole 244 being formed with tongues 245 which co-operate in known manner to constitute a screw box—see Figures 10D, 10E and 10F which show the strap 24 in end elevation, side elevation and plan respectively.

It will be seen that after the hooked end 241 of the strap 24 has been engaged with the hooked section 231 of the annulus 23 rotation of the drawbolt 32 by means of a screwdriver through the co-operation of the screw threaded portion of the drawbolt 32 and the nut section 244, 245 of the strap 24 causes the strap 24 to draw the annulus 23 firmly into position.

It will be seen also that the wedge shaping of the box section 312 facilitates a location of the said section within a slot 21.

In the embodiment of the invention illustrated in Figures 11, 11A, 11B, 11C, 11D, 11E, 11F, 11G and 11H, the strap 24 is formed at one end with a hooked section 241 as in the embodiments already described whilst the other end is curled as at 246 to embrace a transverse pin 34 passed through the space enclosed by the curled portion 246, said pin 34 being of a similar length to the curled portion 246 and of a diameter substantially equal to the internal diameter of the curled portion 246.

The pin 34 aforesaid and the opposed embracing portions of the curled portion 246 are provided at the centre with registering holes 247, the wall of the hole 314 in the pin 34 being tapped—see particularly Figures 11D, 11E, 11F which show the strap 24 in side elevation, end elevation and plan respectively, and Figures 11G and 11H which show the pin 34 in plan and end elevation respectively.

The tapped hole 314 in the pin 34 is engaged by the correspondingly screw threaded shank of a screw drawbolt 35 the outer portion of which is turnably mounted in a slot 361 formed in the limb 362 of a sheet metal bracket 36 the limb 363 of which is slotted for engagement by the edge of a shaped portion 203 of the nave section of a wheel. The bracket 36 is shown in rear elevation, side elevation and plan in Figures 11A, 11B, 11C respectively.

It will be seen that by rotating the screw bolt 35 the strap 24 can be caused to draw the annulus 23 into position on the wheel.

According to the arrangement illustrated in Figures 12, 12A, 12B, 12C, 12D, 12E and 12F, the improved securing means incorporates a looped wire strap 24 the forward end of which is hooked as at 241 for engagement with the hooked section 231 of the annulus 23.

The ends 248 of the sides of the strap are turned inwardly and engaged within holes 371 in ear pieces 372 of a pressing 37 of inverted U shape in cross section, said pressing 37 being of arcuate formation and of a greater diameter than the depth of the slot 21.

The pressing 37 is also provided with a finger grip 373.

The holes 371 are arranged in eccentric relationship relatively to the axis of rotation of the pressing 37, so that when the hooked end 241 of the strap 24 has been engaged with the hooked section 231 of the annulus 23 the pressing 37 may be turned to exert an over centre action so as to draw the strap 24 inwardly and so cause the annulus 23 to be drawn into firm contact with the wheel.

It should be pointed out that the type of draw means to be used is determined by the design of the particular wheel to which an annulus is to be attached.

Thus, where the design is such that the walls of the shaped portions 203 are shallow the draw means illustrated with reference to Figures 3–6 is especially suitable, whilst in the case where the said walls are relatively deep the construction illustrated with reference to Figures 11–11H is particularly suitable.

I claim:

1. Means for embellishing pressed vehicle wheels, comprising an annulus, arcuate anchorage means of a hook shape in cross section located on the rear side of the annulus and a plurality of attachment devices each of which incorporates a retractable part adapted to be passed through a gap in a wheel and engaged in hooked relationship with the presented portion of the arcuate anchorage means, a part adapted to take an abutment on the opposite side of the wheel to that on which the annulus is to be located and means for imparting a retractile force to the retractable part when engaged with the anchorage means whereby the annulus may be retracted into position on a wheel and secured thereto with the retractable parts in a state of tension.

2. Means for embellishing pressed vehicle wheels, comprising an annulus, arcuate anchorage means of a hook shape in cross section formed by curling inwardly and upwardly the inner peripheral portion of the annulus and a plurality of attachment devices each of which incorporates a retractable part adapted to be passed through a gap in a wheel and engaged in hooked relationship with the presented portion of the arcuate anchorage means, a part adapted to take an abutment on the opposite side of the wheel to that on which the annulus is to be located and means for imparting a retractile force to the retractable part when engaged with the anchorage means whereby the annulus may be retracted into position on a wheel and secured thereto with the retractable parts in a state of tension.

3. Means for embellishing pressed vehicle wheels according to claim 1 in which an attachment device comprises a part adapted to take an abutment against the wheel on the opposite side to that on which the annulus is to be located, a strap having a hooked section adapted to be engaged in hooked relationship with the anchorage means at any presented position and which is retractably mounted relatively to said abutment part and a screw threaded means associated with the abutment means and adapted for manipulation so as to exert a pull on the strap whereby the annulus may be pulled into position on the wheel and secured thereto with the strap in a state of tension.

4. Means for embellishing pressed vehicle wheels according to claim 1 in which an attachment device comprises a housing adapted to take a fixed abutment against the wheel on the opposite side to that on which the annulus is to be located, a strap slidably mounted relatively to said housing and having a hooked section adapted to be engaged in hooked relationship with the anchorage means aforesaid and a screw means turnably mounted in the abutment housing and having a meshing relationship with the strap whereby the strap can be caused to exert a pull on the attachment and thereby to cause the said attachment to be drawn into position on the wheel and to be secured thereto with the strap in a state of tension.

5. Means for embellishing pressed vehicle wheels according to claim 1 in which an attachment device comprises a housing adapted to take a fixed abutment against the wheel on the opposite side to that on which the annulus is to be located, a strap displaceably mounted within the housing and having a hooked section adapted to engage the anchorage means aforesaid in a hooked relationship and a worm turnably mounted in the housing and adapted to have a meshing engagement with the strap so that by turning the worm the strap can be caused to exert a pull on the attachment and so cause the attachment to be drawn into position on the wheel and secured thereto with the strap in a state of tension.

6. Means for embellishing pressed vehicle wheels according to claim 1 in which an attachment device comprises a housing adapted to have a fixed abutment with the wheel on the side opposite to that on which the annulus is to be located, a strap displaceably mounted within the housing and having a hooked section adapted to engage the anchorage means aforesaid in a hooked relationship and a screw turnably mounted relatively to the housing and having a meshing engagement with the strap so that by turning the screw the strap can be caused to exert a pull on the attachment and so cause the said attachment to be drawn into position on the wheel and to be secured thereto with the strap in a state of tension.

7. Means for embellishing pressed vehicle wheels according to claim 1 in which an attachment device comprises a sleeve adapted to take an abutment against a part of the wheel on the side opposite to that on which the annulus is to be located, a means having a hooked section adapted to engage the anchorage means aforesaid in a hooked relationship, a drawbolt which is attached to the said means and which is displaceably mounted within the sleeve and a nut which is adapted to be engaged with the drawbolt so that a drawbolt can be caused to impart a pull on a strap thereby causing the said attachment to be drawn into position on the wheel and to be secured thereto with the strap in a state of tension.

8. Means for embellishing pressed vehicle wheels according to claim 1 in which an attachment device comprises a draw bar having a hooked section adapted to engage the anchorage means aforesaid in a hooked relationship and a turnable member which has an eccentric connection with the draw bar and which is adapted to take an abutment against the wheel so that by imparting a turning movement to the turnable member an over centre action can be induced which causes the draw bar to exert a pull on the attachment whereby the said attachment is drawn into position on the wheel and so secured thereto with the strap in a state of tension.

9. In the combination of a pressed disk-type wheel having a rim secured to the outer periphery thereof and a plurality of equidistantly spaced air ventilating slots in said wheel adjacent the outer periphery thereof; with an embellishment for said wheel comprising an annulus having an arcuate anchorage portion of hook shape in cross section located on the rear side of said annulus and means for securing said annulus to said wheel, said securing means including a plurality of equidistantly spaced devices each of which incorporates a retractable part extending through said slots in said wheel and engaged in hooked relationship with the presented portion of said arcuate anchorage of said annulus, a part adapted to take an abutment on the opposite side of said wheel to that on which the annulus is located and means for imparting a retractable force to said retractable part whereby the annulus is retracted into position on said wheel and secured thereto with the retractable parts in a state of tension.

NORMAN RYCROFT.

REFERENCES CITED

The following references are of record in the file of this patent:

UNITED STATES PATENTS

| Number | Name | Date |
|---|---|---|
| 2,106,586 | Zerk | Jan. 25, 1938 |
| 2,368,235 | Lyon | Jan. 30, 1945 |
| 2,428,469 | Plant et al. | Oct. 7, 1947 |

FOREIGN PATENTS

| Number | Country | Date |
|---|---|---|
| 179,431 | Great Britain | May 11, 1922 |
| 462,025 | Great Britain | Feb. 26, 1937 |